(12) United States Patent
Zucker et al.

(10) Patent No.: US 11,055,539 B2
(45) Date of Patent: Jul. 6, 2021

(54) IMAGE PROCESSING FOR DISTINGUISHING INDIVIDUALS IN GROUPS

(71) Applicant: NCR Corporation, Atlanta, GA (US)

(72) Inventors: Brent Vance Zucker, Roswell, GA (US); Adam Justin Lieberman, Suwanee, GA (US); Nathan Somavarapu, Atlanta, GA (US)

(73) Assignee: NCR Corporation, Atlanta, GA (US)

( * ) Notice: Subject to any disclaimer, the term of this patent is extended or adjusted under 35 U.S.C. 154(b) by 99 days.

(21) Appl. No.: 16/144,563

(22) Filed: Sep. 27, 2018

(65) Prior Publication Data

US 2020/0104603 A1 Apr. 2, 2020

(51) Int. Cl.
G06K 9/00 (2006.01)
H04W 4/33 (2018.01)
G06N 20/00 (2019.01)

(52) U.S. Cl.
CPC ..... *G06K 9/00778* (2013.01); *G06K 9/00375* (2013.01); *G06N 20/00* (2019.01); *H04W 4/33* (2018.02)

(58) Field of Classification Search
CPC .......................... G06K 9/00778; G06K 9/00375
See application file for complete search history.

(56) References Cited

U.S. PATENT DOCUMENTS

| | | | | |
|---|---|---|---|---|
| 10,438,164 B1* | 10/2019 | Xiong | | G06K 9/78 |
| 2003/0107649 A1* | 6/2003 | Flickner | | G06K 9/00362 |
| | | | | 348/150 |
| 2008/0123968 A1* | 5/2008 | Nevatia | | G06K 9/00369 |
| | | | | 382/228 |
| 2008/0259163 A1* | 10/2008 | Yu | | G06K 9/32 |
| | | | | 348/169 |
| 2009/0097739 A1* | 4/2009 | Rao | | G06K 9/00362 |
| | | | | 382/159 |
| 2009/0296989 A1* | 12/2009 | Ramesh | | G06K 9/00771 |
| | | | | 382/103 |
| 2011/0279685 A1* | 11/2011 | Alahi | | G06K 9/00624 |
| | | | | 348/187 |
| 2013/0101223 A1* | 4/2013 | Kawanishi | | H04N 5/91 |
| | | | | 382/195 |
| 2014/0347475 A1* | 11/2014 | Divakaran | | G06K 9/00771 |
| | | | | 348/135 |
| 2016/0140399 A1* | 5/2016 | Yano | | G06K 9/00778 |
| 2016/0259980 A1* | 9/2016 | Mlybari | | G06T 7/277 |
| 2016/0343146 A1* | 11/2016 | Brown | | G06K 9/481 |
| 2017/0053409 A1* | 2/2017 | Yamamoto | | G06K 9/00362 |
| 2017/0220871 A1* | 8/2017 | Ikeda | | G08B 25/00 |
| 2018/0173940 A1* | 6/2018 | Ye | | G06K 9/00369 |

(Continued)

OTHER PUBLICATIONS

Wojke, Nicolai, et al., "Simple Online and Realtime Tracking with a Deep Association Metric", 2017 IEEE International Conference on Image Processing (ICIP), (Sep. 2017), 5 pages.

*Primary Examiner* — Wen W Huang
(74) *Attorney, Agent, or Firm* — Schwegman, Lundberg & Woessner

(57) ABSTRACT

Cameras capture time-stamped images of predefined areas. At least one image includes a representation of multiple individuals in a group of individuals. Attributes retained with each individual are combined with a limb and pose recognition to properly identify each individual of the group within the image.

20 Claims, 4 Drawing Sheets

(56) References Cited

U.S. PATENT DOCUMENTS

2019/0042851 A1* 2/2019 Varadarajan ....... G06K 9/00771
2019/0346967 A1* 11/2019 Ikeda ................. G06K 9/00671
2020/0005225 A1* 1/2020 Chaubard ............ G06K 9/3241

* cited by examiner

IMAGE PROCESSING FOR DISTINGUISHING INDIVIDUALS IN GROUPS

BACKGROUND

Current people detection models have difficulty detecting individual people from an image depicting a group of people. When an image of a variety of people packed tightly together is sent to existing approaches, the existing approaches produces output identifying the group as a single individual or produces output identifying no individual in the group.

In fact, detecting multiple individuals in a single image when each of the individuals have definable separation between one another is a difficult problem to solve with existing image processing techniques. Detecting individuals when no separation is present in groups is an even more difficult problem that heretofore has been unsolved.

SUMMARY

In various embodiments, methods and a system for image processing to detect individuals in groups are presented.

According to an embodiment, a method for image processing to detect individuals in groups is presented. An image that depicts multiple individuals in a group is received. Attributes associated with each individual are obtained. Limb attributes represented within the image and identified and the limb attributes are assigned to particular ones of the multiple individuals as limb assignments. The attributes and the limb assignments are processed against the image, and metadata that uniquely identifies each of the multiple individuals within the image are provided based on the processing.

DETAILED DESCRIPTION

Figure 1:
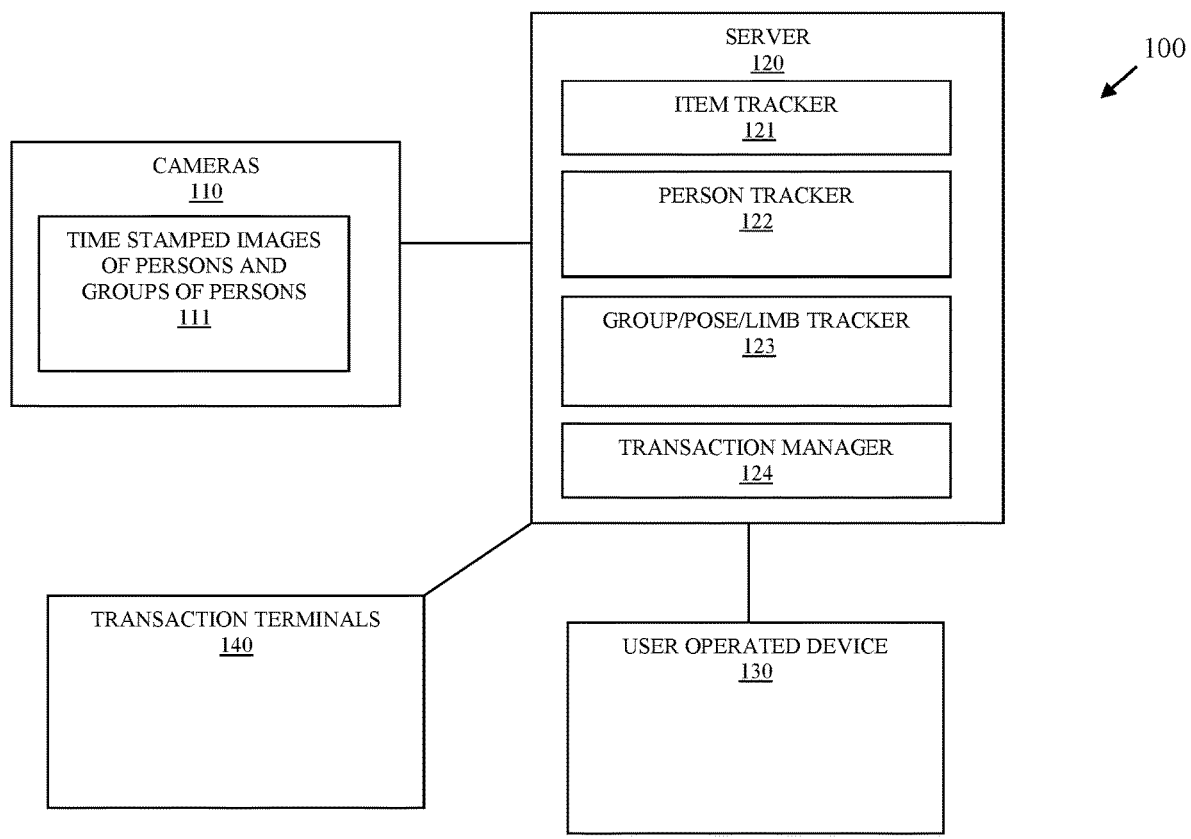
FIG. 1 is a diagram of a system for image processing to detect individuals in groups, according to an example embodiment.

FIG. 1 is a diagram of a system 100 for image processing to detect individuals in groups, according to an example embodiment, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of image processing to detect individuals in groups, presented herein and below.

As used herein and below, the terms "customer," "consumer," and "user" may be used interchangeably and synonymously.

The system 100 includes a plurality of cameras 110 that capture time-stamped images of persons and groups of persons (herein after just "defined area images 111"). The system 100 may include a user-operated device 130 and one or more transaction terminals 140. The server 120 includes executable instructions that execute on one or more hardware processors of the server 120 from a non-transitory computer-readable storage medium as: an item tracker 121, a person tracker 122, a group/pose/limb tracker 123, and a transaction manager 124.

It is to be noted that although not illustrated in the FIG. 1, the server 120 also includes one or more hardware processors, volatile and non-volatile memory, non-volatile storage, and networking circuitry (such as wired ports and/or wireless transceivers).

It is also to be noted that there may be multiple servers, such that the different elements 121-124 may execute on a same server 120 or multiple different servers networked together.

When a customer enters a store or is outside the store in the parking lot, cameras 110 begin capturing the time-stamped images 111 in frames. In an embodiment, the cameras 110 capture images at a rate of 20 to 30 frames per second.

The cameras 110 are preconfigured to capture images 111 of the defined areas based on the field-of-view of the lenses of the cameras 110. Some of the cameras 110 may capture images 111 representing portions of a different area that a different one of the cameras 110 captures images 111 for. That is, each image 111 can include pixel values that overlap multiple ones of the defined areas.

Initially, the cameras 110 are situated in locations throughout an enterprise (such as a retail store but can be other enterprises or even a consumer's home). Each camera lens configured to cover one or more predefined areas of the physical space of the enterprise.

Furthermore, metadata is assigned to each camera 110 to include a unique camera identifier, a location identifier (representing the physical location that the camera 110 is situated within the enterprise, and one or more area identifiers (representing the predefined areas that the lens of the camera 110 captures in the images 111).

Each camera 110 provides time stamp and frame stamped images to the server 120. These images can be streamed over a wired or wireless connection between the cameras 110 and the server 120 to a commonly accessible storage area on the server 120 that is accessible to the item tracker 121, the person tracker 122, and the group/pose/limb tracker 123. In an embodiment, some of the images when streamed from the cameras 110 can be buffered or cached in memory of cache and made accessible from the memory or cache to the item tracker 121, the person tracker 122, and the group/pose/limb tracker 123.

Each accessible image 111 includes its metadata (minimally including what was discussed above) with its image 111 on the server 120.

The person tracker 122 processes the pixels of the images to identify a unique person (the actual identity of the person can be unknown but the person tracker identifies that a person is in the time-stamped images 111). Attributes for the unique person are identified as metadata that permit the person tracker 122 to quickly and accurately identify the unique person as that person travels through the store and exits the store from the time-stamped images 111. Attributes can include clothing type, color, height, width, shoes, extremity features, eye glasses (sun glasses), hats, eye color, etc. A bounding box is placed around the unique person with the generated metadata. As more images 111 are captured from the cameras 110, the additional attributes can be added to the metadata, some existing attributes can be modified as modified metadata, some existing attributes initially believed to be associated with the person can be removed as deleted metadata. The person tracker 122 may also have its own machine-learning algorithm that is trained over time, such that the types of attributes represented in the metadata changes or the pixel information associated with particular metadata is changed. In this way, the accuracy of the person tracker 122 improves with time as does the processing throughput associated with producing the metadata representing the attributes from the images 111.

In an embodiment, the person tracker 122 is configured with facial recognition to obtain an identity of a person being tracked from the images.

In a similar manner, the item tracker 121 identifies from the images 111 items that are handled by the people being tracked by the person tracker 122. That is, the item tracker 121 receives the images, crops off pixels that are known to not be associated with the item (such as the pixels associated with background objects or a person). Each item includes a unique identifier for tracking even though the actual item may be unknown or unrecognized from the images. That is, (and similar to the person tracker 122), an item identity (such as the item's description, actual item barcode level of detail, etc.) is unknown in the time-stamped frames but is still assigned and associated with a unique tracking identifier in the frames/images 111 so as to distinguish between other unknown items of the store or other unknown items possessed by the customer. Again, attributes associated with the unknown item is carried as metadata from frame 111 to frame, so that the item tracker 121 can quickly identify and crop from later-in-time received images 111 the specific pixels or bounding box being tracked for the unknown item. Attributes can include, color, height, width, edges, bottle shape, item label or packaging characteristics, can shape, box shape, undefined shape, edges, etc.

Some frames of the images 111 may include multiple persons, such that some persons obfuscate or partially conceal other persons in the group. This can occur for a variety of reasons and frequently occurs when a popular area of a store is congested with multiple people. Therefore, single frame can include representations of multiple people in a group.

The person tracker 122 is aware that specific tracked persons are supposed to be present in the frames but is unable to accurately identify each of the individual persons. In such situations, the person tracker 122 passes the image frame to the group/pose/limb tracker 123 along with each individual person's bounding box attributes.

The person tracker 122 maintains coordinates (x and y coordinates) for each person being tracked in the image frames These coordinates are used for tracking a person using a bounding box superimposed on the images 111. However, when an image frame 111 is present where the person tracker 122 is expecting to see multiple (more than 1 person) and 1 or no persons are detectable, the person tracker 122 consults the group/pose/limb tracker 123.

The group/pose/limb tracker 123 is configured as a deep machine-learning algorithm that processes stacks of convolutional layers that perform localization with a combination of classification and regression to determine the four coordinates of each person in a group from an image. In some cases, this localization includes individual pose or limb recognition. That is, the group/post/limb tracker 123 is trained to identify body parts and assign those body parts to the persons that are expected to be in the image 111 of the group. Assignment can be based on proximity of a limb to a specific person within the image. The group/post/limb tracker 123 returns a labeled version of the image 111 of the group having the four coordinates (max x, min x, max y, min y) for each person that the person tracker 122 was expecting to be in the image 111 of the group. This allows the person tracker 122 to maintain the bounding boxes for each individual person within the image 111 of the group. This is significant because an item being tracked by the item tracker 121 may be possessed or taken by a particular person in the image of the group and the association between the correct person with the item has to be made for a frictionless store implementation of the system 100.

The person tracker 122 identifies the number of persons that the person tracker 122 believes to be present in an image 111 of a group and provides each person's attributes to the group/pose/limb tracker 123 as input. The group/pose/limb tracker 123 is trained to use those attributes as input and produce as output the coordinates of each expected person's bounding box for the image 111 of the group. The group/pose/limb tracker 123 may count limbs present in the image of the group as a preprocessing step and then uses this limb information along with the attributes of each expected person as input to a machine-learning trained algorithm for receiving as output an association of each limb with a particular person and a bounding box within the image 111 of the group for each expected person.

This permits the item tracker 121 to properly associate any item taken by a person of the group in the image 111 to be assigned to the proper person being tracked by the person tracker 122. The association of possessed items along with the specific person is then processed to notify the transaction manager 124. The transaction manager 124 maintains a shopping cart for each person (known identity or unknown identity). The transaction manager 124 is notified when items are to be added or removed from a particular person's shopping cart.

The transaction manager 124 can check out any given person in a variety of manners. When the person tracker 122 has identified a customer and the customer is pre-registered with the store and has a registered payment method, then the transaction manager can process that payment method when the person is identified by the person tracker 122 as approaching or leaving an egress point of the store. When the person tracker 122 was unable to obtain the identity of the person, the person can check out at a transaction terminal 140; the transaction manager 124 interacts with an agent process on the transaction terminal 140 and provides the shopping cart items for payment when the person tracker 122 identifies the person as being present at the transaction terminal 140. When the person (identified or unidentified) has a mobile application downloaded to the person's user device 130, the transaction manager interacts with the mobile application to present the items in the shopping cart and obtain payment from the person. Other approaches for checkout may be used as well, where the transaction manager 124 and the person tracker 122 cooperate to obtain payment for known persons (identity known) and for unknown persons (identity unknown).

In an embodiment, the group/pose/limb tracker 123 also is trained to detect the pose (posture, angle of posture, etc.) of each person present in an image 111 of a group.

The group/pose/limb tracker 123 provides a fine-grain analysis of an image 111 where there person tracker 122 is expecting more than 1 person to be present in that image 111. The group/pose/limb tracker 123 is a machine-learning trained application that returns results permitting the person tracker 122 and the item tracker 121 to properly identify each person's bounding box, pose, and limbs within the image of the group. This allows for distinguishing each individual in a group within an image and substantially improves frictionless store applications and/or security-based applications.

In an embodiment, the transaction terminal 140 is one or more of: A Point-Of-Sale (POS) terminal and a Self-Service Terminal (SST).

In an embodiment, the user-operated device 130 is one or more of: a phone, a tablet, a laptop, and a wearable processing device.

These embodiments and other embodiments are now discussed with reference to the FIGS. 2-4.

Figure 2:
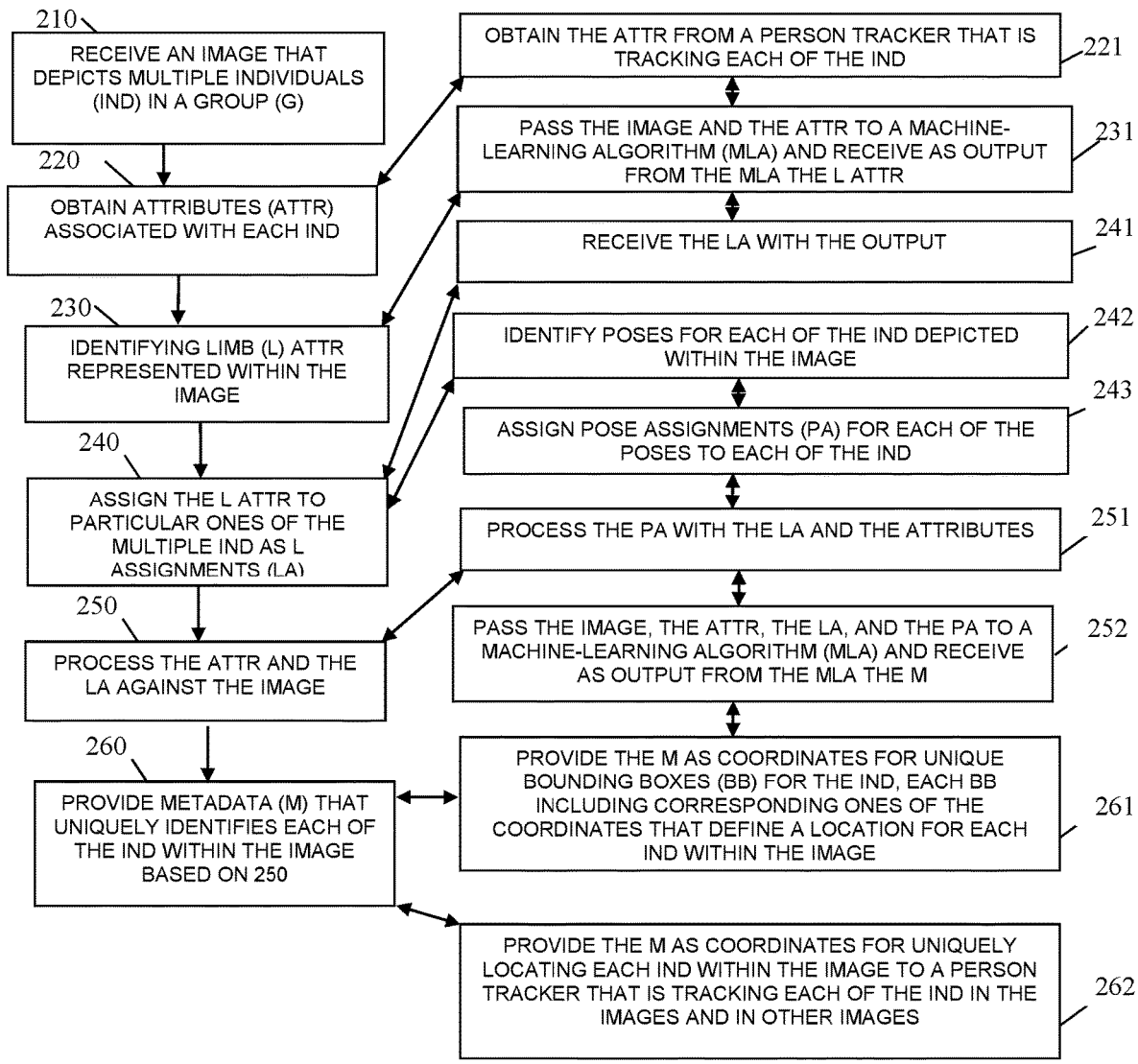
FIG. 2 is a diagram of a method for image processing to detect individuals in groups, according to an example embodiment.

FIG. 2 is a diagram of a method 200 for image processing to detect individuals in groups, according to an example embodiment. The software module(s) that implements the method 200 is referred to as an "individual differentiator." The individual differentiator is implemented as executable instructions programmed and residing within memory and/or a non-transitory computer-readable (processor-readable) storage medium and executed by one or more processors of a device. The processor(s) of the device that executes the individual differentiator are specifically configured and programmed to process the individual differentiator. The individual differentiator has access to one or more network connections during its processing. The network connections can be wired, wireless, or a combination of wired and wireless.

In an embodiment, the device that executes the individual differentiator is the server 120. In an embodiment, the server 120 is a cloud-based server.

In an embodiment, the individual differentiator is all or some combination of: the item tracker 121, the person tracker 122, and the group/pose/limb tracker 123.

At 210, the individual differentiator receives an image that depicts multiple individuals within a single frame or image. The image is time and uniquely frame numbered. Such that each image is unique identified from the camera that captured the image, the time the image was taken, and the coverage area identifier that is predefined and associated with the camera (as was discussed above with the FIG. 1).

At 220, the individual differentiator obtains attributes associated with each individual. These attributes were discussed above with reference to the item tracker 121 and the person tracker 122. Attributes are pixel values determined to represent each individual by the person tracker 122.

Accordingly and in an embodiment, at 221, the individual differentiator obtains the attributes from a person tracker, such as person tracker 122 that is tracking each of the individuals in the image and in other images captured by the cameras 110.

At 230, the individual differentiator identifies limb attributes representing limbs that are present in the group image (image being processed by the individual differentiator).

In an embodiment of 221 and 230, at 231, the individual differentiator passes the image and the individual attributes to a deep learning machine-learning algorithm that is trained to identify the limbs from an image given the attributes for the individuals. The individual differentiator receives as output from the machine-learning algorithm the limb attributes.

At 240, the individual differentiator assigns the limb attributes to particular ones of the multiple individuals as limb assignments.

In an embodiment of 231 and 240, at 241, the individual differentiator receives the limb assignments with the output provided by the machine-learning algorithm.

In an embodiment, at 242, the individual differentiator identifies poses for each of individuals depicted within the image. These poses can include an individual's angle of orientation, posture, gestures, limb positions, etc.

In an embodiment of 242, at 243, the individual differentiator assigns pose assignments for each of the poses to each of the individuals represented within the single image of the group of individuals.

At 250, the individual differentiator processes the attributes and the limb assignments against the image to distinguish each individual separately from the other individuals represented within the single group image.

In an embodiment of 243 and 250, at 251, the individual differentiator processes the pose assignments with the limb assignments and the attributes when performing the processing at 250.

In an embodiment of 251, at 252, the individual differentiator passes the image, the attributes, the limb assignments, and the pose assignments to a deep learning machine-learning algorithm. The machine-learning algorithm is trained to identify unique individuals based on the provided input from a single image representing a group of individuals.

At 260, the individual differentiator provides metadata that uniquely identifies each of the individuals depicted within the image based on the processing at 250.

In an embodiment of 252 and 260, at 261, the individual differentiator provides the metadata as coordinates for unique bounding boxes for the individuals. Each bounding box including corresponding ones of the coordinates that define a location/position for each separate individual within the image.

In an embodiment, at 262, the individual differentiator provides the metadata as coordinates for uniquely locating each individual within the image to a person tracker that is tracking each of the individuals in the images and other images in a frictionless store or security system. In an embodiment, the person tracker is the person tracker 122.

Figure 3:
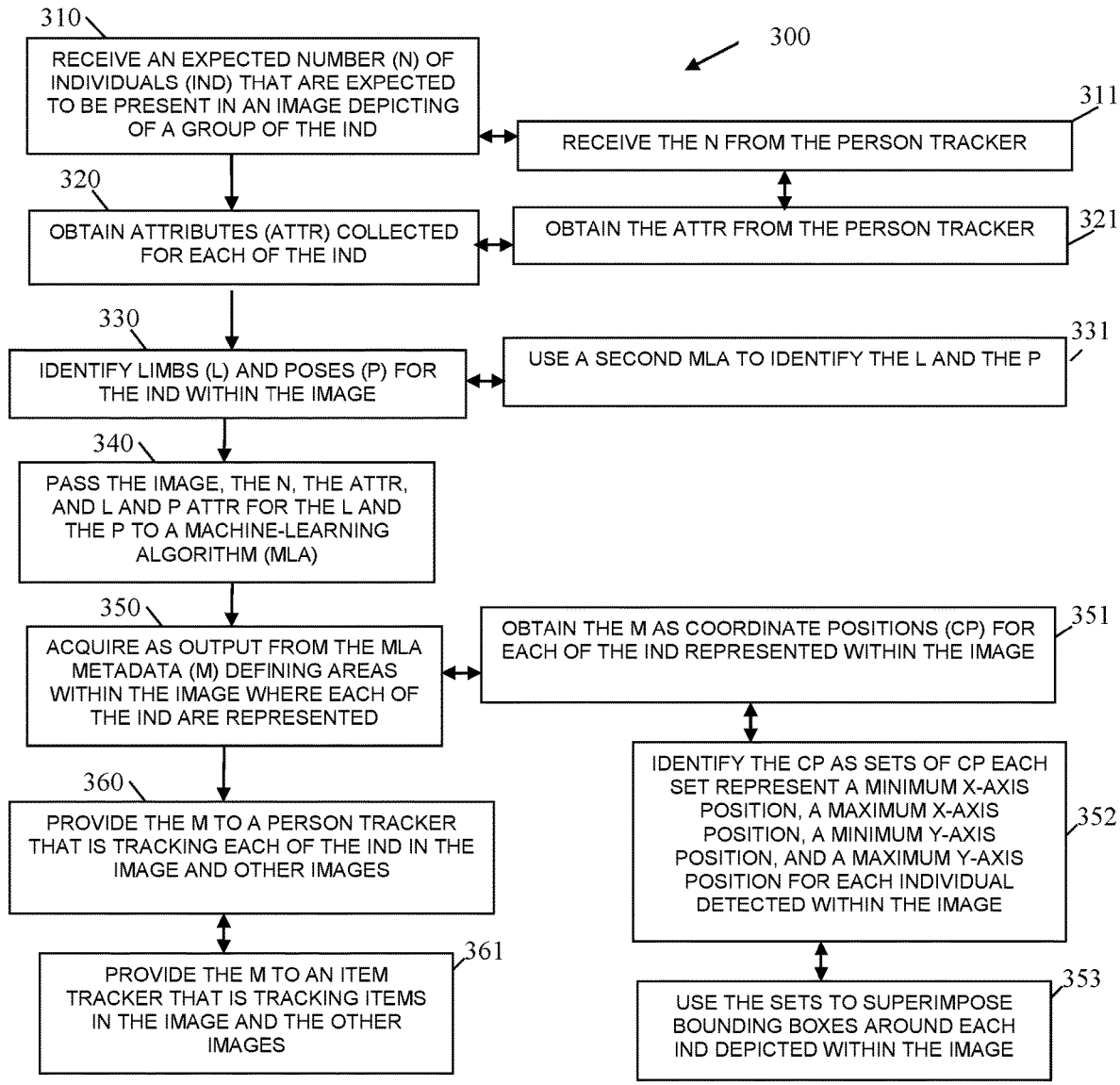
FIG. 3 is a diagram of another method for image processing to detect individuals in groups, according to an example embodiment.

FIG. 3 is a diagram of another method 300 for image processing to detect individuals in groups, according to an example embodiment. The software module(s) that implements the method 300 is referred to as a "group manager." The group manager is implemented as executable instructions programmed and residing within memory and/or a non-transitory computer-readable (processor-readable) storage medium and executed by one or more processors of a device. The processors that execute the group manager are specifically configured and programmed to process the group manager. The group manager has access to one or more network connections during its processing. The network connections can be wired, wireless, or a combination of wired and wireless.

In an embodiment, the device that executes the group manager is the server 120. In an embodiment, the server 120 is a cloud processing environment.

In an embodiment, the group manager is all of or some combination of: the item tracker 121, the person tracker 122, the group/pose/limb tracker 123, and/or the method 200.

The group manager presents another and in some ways enhanced processing perspective of the method 200 discussed above.

At 310, the group manager receives an expected number of individuals that are expected or should be present in an image that depicts a group of individuals within a single image or frame being processed.

In an embodiment, at 311, the group manager receives the expected number of individuals from a person tracker that is tracking each of the individuals in the image and other images for a frictionless store or security system. In an embodiment, the person tracker is the person tracker 122.

At 320, the group manager obtains attributes collected for each of the individuals from processing other images subsequent to the processing at 310.

In an embodiment of 311 and 320, at 321, the group manager obtains attributes from the person tracker.

At 330, the group manager identifies limbs and poses for the individuals within the image.

In an embodiment, at 331, the group manager uses a machine-learning algorithm to identify the limbs and the poses. This was discussed above. The machine-learning algorithm is trained to distinguish limbs and poses based on input provided that includes the attributes, the image representing a group of individuals, and optionally the expected number of individuals believed to be present in the image.

At 340, the group manager passes the image, the expected number of individuals, and limb and pose attributes for the limbs and poses to a trained deep-learning machine-learning algorithm.

At 350, the group manager acquires as output from the machine-learning algorithm metadata that defines areas within the image where each of the individuals are being represented.

In an embodiment, at 351, the group manager obtains the metadata as coordinate positions for each of the individuals represented within the image.

In an embodiment of 351, at 352, the group manager identifies the coordinate positions as sets of coordinate positions. Each set of coordinate positions represented as a minimum x-axis position within the image, a maximum x-axis position within the image, a minimum y-axis position within the image, and a maximum y-axis position within the image for each individual detected as being represented within the image.

In an embodiment of 352, at 353, the group manager uses the sets to superimpose bounding boxes around each individual within the image.

At 360, the group manager provides the metadata to a person tracker that is tracking each of the individuals in the image and other images as a portion of a frictionless store system and/or security system. In an embodiment, the person tracker is the person tracker 122.

In an embodiment, at 361, the group manager provides the metadata to an item tracker that is tracking items in the image and the other images as another portion of the frictionless store system and/or the security system. In an embodiment, the item tracker is the item tracker 121.

Figure 4:
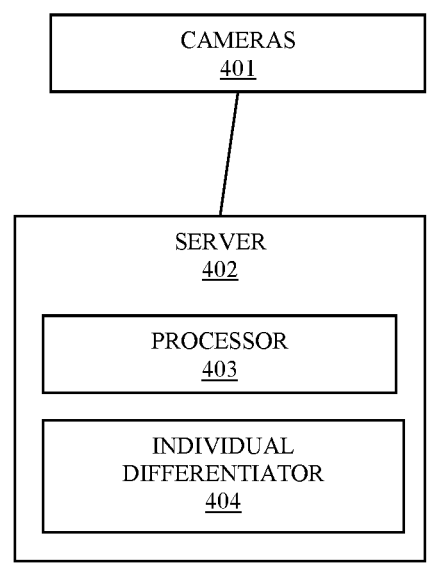
FIG. 4 is a diagram of a system for image processing to detect individuals in groups, according to an example embodiment.

FIG. 4 is a diagram of a system 400 for image processing to detect individuals in groups, according to an example embodiment. The system 400 includes a variety of hardware components and software components. The software components of the system 400 are programmed and reside within memory and/or a non-transitory computer-readable medium and execute on one or more processors of the system 400. The system 400 communicates over one or more networks, which can be wired, wireless, or a combination of wired and wireless.

In an embodiment, the system 400 implements, inter alia, the processing described above with the FIGS. 1-3 with respect to the server 120 and the cameras 110.

In an embodiment, system 400 is the cameras 110 and the server 120.

The system 400 includes a plurality of cameras 401 and a server 402. The server 402 includes at least one hardware processor 403 and configured to execute executable instructions from a non-transitory computer-readable storage medium as an individual differentiator 404.

The individual differentiator 404 when executed from the non-transitory computer-readable storage medium on the processor 403 is configured to: 1) receive attributes associated with individuals being tracked in images; 2) obtain a group image having each of the individuals depicted within the group image; 3) identify limbs and poses for each individual within the group image; 4) create bounding boxes for each individual, each bounding box representing a particular individual represented within the group image based on the attributes, the limbs, and the poses; and 5) provide the bounding boxes to a person tracker that is tracking the individuals in the images and the group image.

In an embodiment, the person tracker is the person tracker 122.

In an embodiment, the individual differentiator 404 is further configured to provide the bounding boxes as sets of coordinates that identify each individual within the group image.

In an embodiment, the individual differentiator 404 is further configured to provide the sets of coordinates to an item tracker that is tracking items in the images. In an embodiment, the item tracker is the item tracker 121.

In an embodiment, the individual differentiator 404 is all or some combination of: the item tracker 121, the person tracker 122, the group manager 123, the transaction manager 124, the method 200, and/or the method 300.

In an embodiment, the system 100 is deployed as a portion of a frictionless store implementation where customers (individuals) shop through computer-vision and image processing and items and individuals are associated with one another with a shopping cart maintained for each individual. Each individual can checkout and pay for his/her shopping cart items using any of the above-referenced techniques discussed with the FIG. 1.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
receiving an image that depicts multiple individuals in a group;
obtaining attributes associated with each individual;
identifying limb attributes represented within the image;
assigning the limb attributes to particular ones of the multiple individuals as limb assignments;
processing the attributes and the limb assignments against the image and counting limbs present in the image based on the limb attributes and attributes of each individual and assigning each limb present in the image to a particular individual;
generating a unique bounding box around each unique individual within the image, each unique bounding box comprising the corresponding limbs of the corresponding individual;
providing metadata associated with each unique bounding box that uniquely identifies each of the multiple individuals within the image based on the processing and the generating;
maintaining 4 coordinates within the image for each unique bounding box of each individual in the group based on the metadata;
labeling the image with each detected body part of each individual using the corresponding 4 coordinates of that individual and the limb assignments;
monitoring each individual for being in possession of a particular item and assigning the particular item to that individual within the image based on the labeling and a proximity of the particular item to a particular limb of that individual; and
updating the metadata by modifying given attributes assigned to a given individual in the group based on processing subsequent images of the group.

2. The method of claim 1, wherein obtaining further includes obtaining the attributes from a person tracker that is tracking each of the multiple individuals.

3. The method of claim 2, wherein identifying further includes passing the image and the attributes to a machine-learning algorithm and receiving as output from the machine-learning algorithm the limb attributes.

4. The method of claim 3, wherein assigning further includes receiving the limb assignments with the output.

5. The method of claim 1, wherein assigning further includes identifying poses for each of the multiple individuals depicted within the image.

6. The method of claim 5, wherein identifying further includes assigning pose assignments for each of the poses to each of the multiple individuals.

7. The method of claim 6, wherein processing further includes processing the pose assignments with the limb assignments and the attributes.

8. The method of claim 7, wherein processing further includes passing the image, the attributes, the limb assignments, and the pose assignments to a machine-learning algorithm and receiving as output the metadata.

9. The method of claim 8, wherein providing further includes providing the metadata as coordinates for unique bounding boxes for the multiple individuals, each bounding box including corresponding ones of the coordinates that defines a location for each individual within the image.

10. The method of claim 1, wherein providing further includes providing the metadata as coordinates for uniquely locating each individual within the image to a person tracker that is tracking each of the individuals in the images and in other images.

11. A method, comprising:
receiving an expected number of individuals that are expected to be present in an image depicting of a group of the individuals;
obtaining attributes collected for each of the individuals;
identifying limbs and poses for the individuals within the image;
counting the limbs present in the image based on limb and pose attributes and attributes of each individual and assigning each limb present in the image to a particular individual;
passing the image, the expected number, the attributes, a counted number of limbs from the counting, and the limb and pose attributes for the limbs and the poses to a machine-learning algorithm;
generating a unique bounding box for each individual within the image;
acquiring as output from the machine-learning algorithm metadata defining areas within each unique bounding box of the image where each of the individuals are represented;
providing the metadata and the bounding boxes to a person tracker that is tracking each of the individuals in the image and other images;
maintaining 4 coordinates within the image for each unique bounding box of each individual in the group based on the metadata;
labeling the image with each detected body part of each individual using the corresponding 4 coordinates of that individual;
monitoring each individual for being in possession of a particular item and assigning the particular item to that individual within the image based on the labeling and a proximity of the particular item to a particular limb of that individual; and
updating the metadata by modifying given attributes assigned to a given individual in the group based on processing subsequent images of the group.

12. The method of claim 11, wherein receiving further includes receiving the expected number from the person tracker.

13. The method of claim 12, wherein obtaining further includes obtaining the attributes from the person tracker.

14. The method of claim 11, wherein identifying further includes using a second machine-learning algorithm to identify the limbs and the poses.

15. The method of claim 11, wherein acquiring further includes obtaining the metadata as coordinate positions for each of the individuals represented within the image.

16. The method of claim 15, wherein obtaining further includes identifying the coordinate positions as sets of coordinate positions each set represent a minimum x-axis position, a maximum x-axis position, a minimum y-axis position, and a maximum y-axis position for each individual detected within the image.

17. The method of claim 16, wherein identifying further includes using the sets to superimpose bounding boxes around each individual depicted within the image.

18. The method of claim 11, wherein providing further includes providing the metadata to an item tracker that is tracking items in the image and the other images.

19. A system, comprising:
cameras configured to capture images within a store;
a server that includes a processor;
the processor configured to execute executable instructions from a non-transitory computer-readable storage medium as individual differentiator;
the differentiator when executed on the processor configured to:
  receive attributes associated with individuals being tracked in images;
  obtain a group image having each of the individuals depicted within the group image;
  identify limbs and poses for each individual within the group image;
  count the limbs present in the image based on limb and pose attributes and attributes of each individual and assigning each limb present in the image to a particular individual;
  create a unique bounding box for each individual, each unique bounding box representing a given individual represented within the group image based on the attributes, a counted number of the limbs from the count of the limbs, and the limb and pose attributes;
  maintain metadata with the images, wherein the metadata comprises identifiers for the attributes, the limbs, the poses, and the bounding boxes;
  provide the bounding boxes to a person tracker that is tracking the individuals in the images and the group image;
  maintain 4 coordinates within the image for each unique bounding box of each individual in the group based on the metadata;
  label each image with each detected body part of each individual using the corresponding 4 coordinates of that individual;
  monitor each individual for being in possession of a particular item and assigning the particular item to that individual within the corresponding image based on labels present within each image and based on a proximity of the particular item to a particular limb of that individual; and
  update the metadata by modifying given attributes assigned to a given individual in the group based processing the images of the group from one image to a next image.

20. The system of claim 19, wherein the differentiator is further configured to provide the bounding boxes as sets of coordinates that identify each individual within the group image.

* * * * *